C. S. WERT.
CUSHION TIRE.
APPLICATION FILED APR. 25, 1918.
1,329,331.
Patented Jan. 27, 1920.
2 SHEETS—SHEET 1.
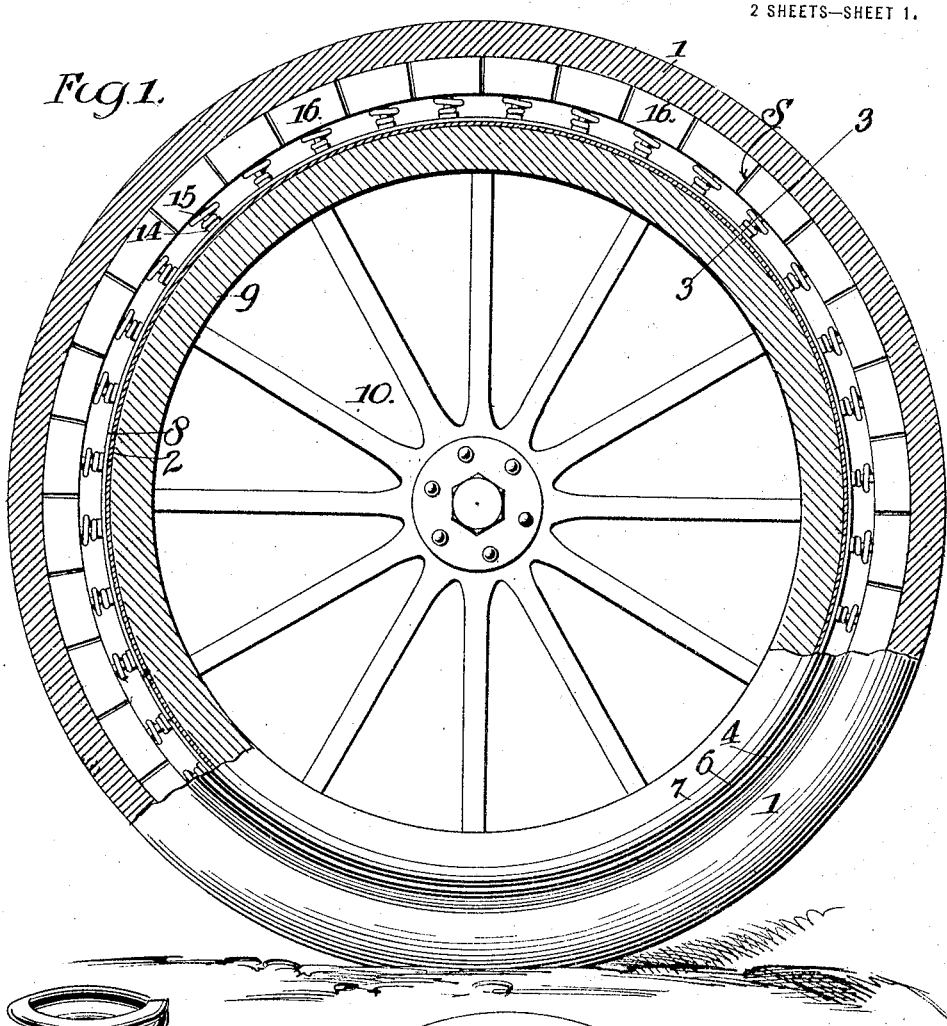
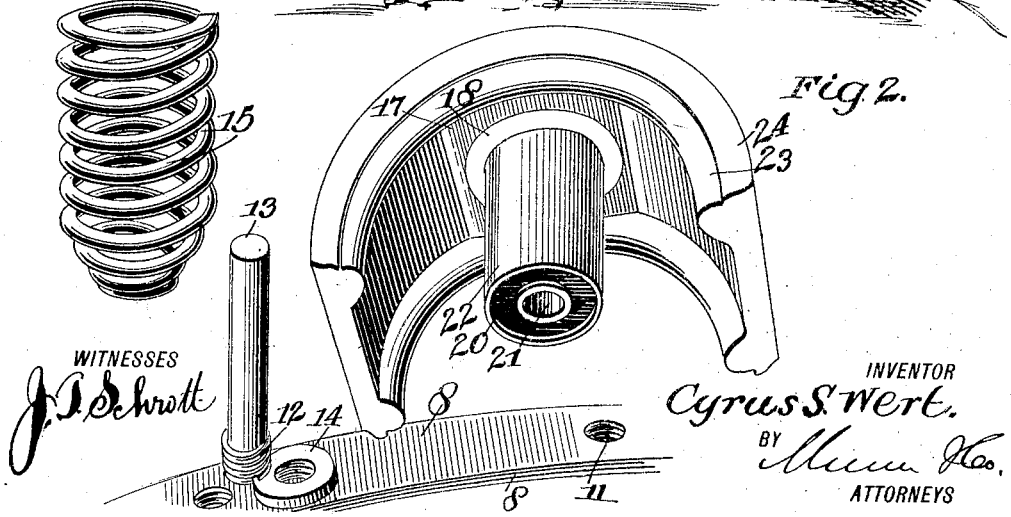

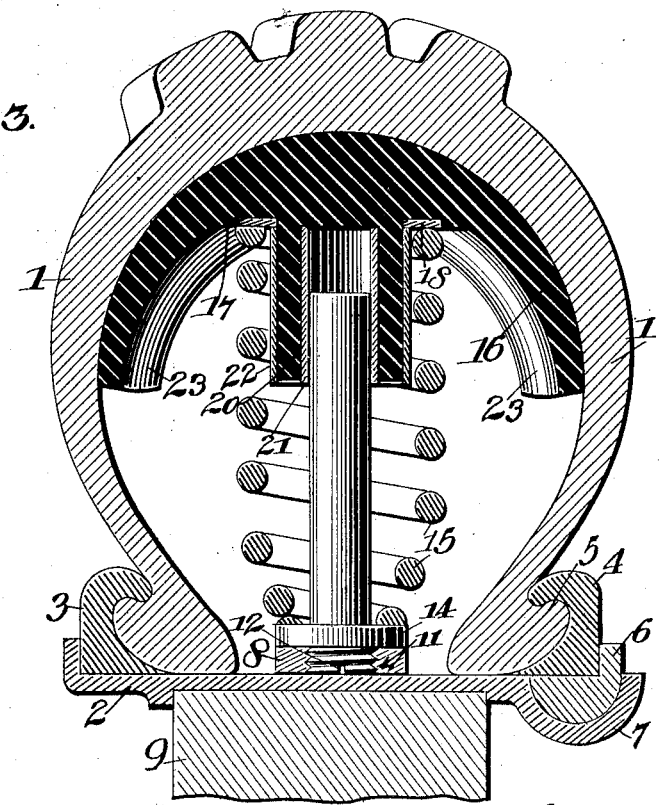

UNITED STATES PATENT OFFICE.

CYRUS SYLVESTOR WERT, OF KENDALLVILLE, INDIANA.

CUSHION-TIRE.

1,329,331.   Specification of Letters Patent.   Patented Jan. 27, 1920.

Application filed April 25, 1918. Serial No. 230,726.

*To all whom it may concern:*

Be it known that I, CYRUS S. WERT, a citizen of the United States, and a resident of Kendallville, in the county of Noble and State of Indiana, have invented certain new and useful Improvements in Cushion-Tires, of which the following is a specification.

My invention relates to improvements in cushion tires, and it consists in the constructions, combinations and arrangements herein described and claimed.

An object of my invention is to provide a cushion tire including as one of the important features, a plurality of resiliently supported shoes arranged to occupy and engage the inside of the tire casing and take the place of the compressed air ordinarily employed to hold the tire in shape.

Another object of the invention is to provide a cushion tire in which the cushion members occupy only that space between the felly of the wheel and the interior surface of the tire casing, the cushion members including a plurality of spring supported shoes with a ring surrounding the felly and providing a mounting for the springs.

Other objects and advantages will appear in the following specification, reference being had to the accompanying drawing, in which:

Figure 1 is an elevation of a vehicle wheel with parts shown in section,

Fig. 2 is a detail perspective view of one of the cushion shoes, the various coöperating parts thereof being shown in disassembled relationship therewith, Fig. 3 is a cross section on the line 3—3 of Fig. 1, and Fig. 4 is a cross section through one of the cushion shoes.

In the present instance, the invention is embodied in a clencher tire casing 1 which is mounted on a modern type of quick-detachable demountable rim 2, as clearly shown in Fig. 3. The rim 2 includes the clencher rings 3 and 4 which engage the beads 5 of the casing 1 in the usual manner. A locking ring 6 in the angular trough 7 of the rim 2, engages the outer one 4 of the clencher rings and holds the tire casing in place on the wheel.

To assemble the cushion shoes and the coöperating parts thereof on a vehicle wheel of the modern construction just described, is a comparatively simple matter, as will presently be more fully explained. In this instance, the parts can be readily slipped over the rim 2 from one side with comparative ease. The assembling of the cushion members inside of the tire casing, is a thing very easily and quickly done when the simple process hereinafter to be explained, is carried out.

Proceeding now with the description of the invention, it will be observed that an iron ring 8 is fitted in place around the rim 2 on the felly 9 of the vehicle wheel 10. The ring 8 has no other means for holding it in place other than the friction between the ring and the rim 2, and the pressure of the springs, described below, thereon. This rim 2 is mounted on the felly of the wheel before the ring 8 is put in place thereon. The ring 8 has thirty-six equi-distantly spaced holes 11 into which the heads 12 of the spindles 13 are screwed from the inside. The threaded heads 12 have notches or grooves to receive the point of a screwdriver so that the heads may be driven flush with the inner surface of the ring 8. A lock nut 14 which in the present instance is in the shape of a ring, is applied to the threaded head 12 and serves to lock the spindle 13 in position. The lock nut 14 also provides a base for the reduced end of the cushion springs 15.

Supported on each of the cushion springs 15 is a shoe 16. There are thirty-six of the shoes 16 on the inside of the tire casing 1, but obviously the number of the shoes 16 may be increased and diminished according to the size of the tire to which the invention is applied. Since each of the shoes 16 and its coöperating parts is of an identical construction, the description of one will suffice for all.

Molded in the flat base 17 on the inside of the shoe 16, is a washer 18 which provides a support for the other and larger end of the cushion spring 15. The washer 18 has a plurality of dowel pins 19 which are embedded in the material of the shoe 16 and serve to hold the washer firmly in position. It should be observed that the ends of the cushion spring 15 are made flat so as to more readily engage the surfaces of the washer and the lock nut.

Extending inwardly from the flat base 17 of the shoe 16 is a hollow boss 20. The boss 20 has a sleeve 22 on the outside and a bushing 21 on the inside. The sleeve 22 provides a sheath that prevents wearing of the boss through the movement of the cushion spring 15 around it. Similarly, the bushing 21 on the inside provides a more durable wearing surface for the spindle 13 which reciprocates in the boss during the operation of the invention inside of the tire. Here it may be explained that the shoe 16 is preferably made of rubber. It is possible that some other material may be employed to equally good advantage, but actual experience has demonstrated that rubber is the best for the purpose. The different metals usually employed in mechanical constructions of this nature, are found to be unsuitable for the purpose in that there is a limit to the bending thereof, and they also have the objectionable features of becoming crystallized and breaking after considerable use. Rubber, which as before stated has been found to be the most suitable for the purpose, adheres very firmly to the contacting surface of the tire casing 1 and the cushion spring 15 bears the cushion 16 so tightly into engagement that there is no creeping of the shoe with respect to the tire casing.

Attention is directed to the peculiar construction of the rubber shoe 16. The transverse edges are provided with heavy beads 23 which are primarily intended to strengthen the shoe and assist in retaining the semi-circular shape thereof. Each bead 23 is molded with a slight offset 24 as clearly shown in Fig. 4. When all of the shoes 16 are assembled on the inside of the tire 1, there is a slight space S between adjacent shoes as shown in Fig. 1. Thus in actual practice, the shoes are not intended to normally be in contact. However, if for any reason the contact between the shoes does occur, the relatively small lateral offsets 24 of the shoes (shown in Fig. 2) will engage, and not the entire opposed surfaces of the beads 23.

Reference has been made to the assembling of the cushion shoes on the felly of the wheel. It has been explained that to apply the invention to the modern type of demountable rim illustrated in Fig. 3, is a comparatively simple matter. After the cushion shoes are once assembled on the iron ring 8 on the inside of the tire casing 1, the entire structure is simply slipped over the rim 2 from the unobstructed side and then locked in position by the means illustrated in Fig. 3. Ordinarily, the mere frictional engagement of the ring 8 with the rim 2 would be sufficient to hold the ring, but the many springs 15 disposed about the wheel press so hard on the ring 8, that the ring will securely grip the rim 2. But in applying the assembled structure to the old style rim wherein the clencher members are integral on both sides, the clencher rim must be first contracted in order that it may be fitted on the inside of the tire casing 1. The manner of assembling the shoes on the inside of the tire casing 1 will now be explained.

The tire casing 1 is laid across a pair of trestles and the iron ring 8 is temporarily supported in place by the hands or some other means until several of the shoes may be fitted in place at various positions around the circumference so as to approximately establish the position of the ring. A short stick is now used as a spreader and is placed between the beads 5 to hold the edges apart. A shoe 16 with the cushion spring 15 assembled in place thereon, is inserted in the spread place, a spindle 13 is inserted in the threaded hole 11 from the inside of the ring 8 and is screwed outwardly into position. Before screwing the spindle 13 into position, however, a lock nut 14 is inserted over the end of the spindle beneath the reduced end of the spring 15 and after the spindle has been screwed to its position, the lock nut is in turn screwed down upon the ring by any suitable wrench. The same process just described is repeated for each of the shoes 16 until all are in position and the operation of assembling the shoes for a single tire by an experienced workman consumes no more than approximately 28 minutes.

Numerous advantages are derived from a cushion tire constructed on the lines herein described. One of the foremost advantages is, the complete avoidance of the great inconvenience occasioned by a blow-out at a most inopportune time. This is a trouble that is to be constantly anticipated in a pneumatic tire. When a set of the cushion shoes 16 is once installed inside of the tire casing, no further attention need be given the tire so far as the operation of the cushion members on the inside is concerned. The frictional engagement between the iron ring 8 and the rim 2 of the wheel, is so great that there is absolute security and no possibility of creeping between the parts. This frictional engagement is partly inherent in the ring but is further produced by the pressure of the springs 15, as stated above. The tension of the cushion springs 15 may be so regulated that the difference between the mechanical cushioning means herein described and the pneumatic cushioning means in the ordinary tire cannot be perceived by an occupant of the car to which tires of this type are applied.

While the construction and arrangement of the device as herein described is that of a generally preferred form, obviously modifications and changes may be made without departing from the spirit of the invention or the scope of the claims.

I claim:—

1. The combination in a tire, of a series of casing engaging resilient sections, a rim engaging ring, a single guide spindle extending from the ring for each section, including spindle mounting means, arranged to enable introduction of the spindle from the inside of the ring, and locking means therefor; and individual springs bearing on said locking means and supporting said sections independently.

2. A tire, comprising a casing, a series of resilient sections extending in circumferential series around the casing and provided each with an integral inwardly projecting tubular boss, sheathing means on the inside and outside of said boss, a spring supporting each section independently and fitting at the outer end around said boss, a ring, a spindle projecting from the ring through each spring and into the boss to form a guide, including a threaded portion secured in the ring; and locking means thereon for said spindle providing a base for said spring.

3. In a tire, a casing, a series of resilient sections within the casing, an integral hollow boss projecting inwardly from each section, a spring surrounding the boss at one end, means embedded in each section at the base of the boss for receiving said end of the spring, a spindle projecting into the boss and forming a guide, and means on the outside and inside of the tubular boss providing a sheath for the boss against the spring and the spindle respectively.

4. In a tire, a casing, a ring, a series of resilient sections within the casing, a hollow boss projecting inwardly from each section, a flat base formed on the section at the point of connection of the hollow boss, a washer embedded flush with the flat base and having means for holding it in place, a spindle for each of the sections projecting outwardly from the ring, each spindle having a threaded head screwed into the ring, a lock nut on the threaded head providing a spring base, a cushion spring surrounding the spindle and the hollow boss, engaging the embedded washer and the lock nut at the outer and inner ends respectively, and means including a sleeve and a bushing providing a sheath for the outside and inside of the hollow boss.

5. In a tire, a casing, a series of resilient sections within the casing and extending circumferentially around the same and in normally spaced apart relationship, beads formed on the transverse edges of each section to strengthen the section and preserve its shape, each section including an offset portion adjacent to the bead providing a relatively small contacting surface in the event of the engagement of a pair of the sections, a supporting ring, individual springs supporting said sections, between the sections and the ring, and means projecting outwardly from the ring occupying positions inside of the respective springs, and engaging portions of the companion sections to form guides.

CYRUS SYLVESTOR WERT.